Figure 1:
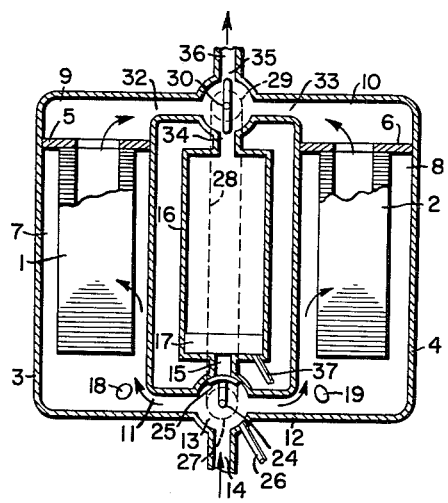

Dec. 7, 1965    J. MULLER    3,221,888
CLEANING DEVICE FOR FLUID FILTER
Filed May 8, 1962

INVENTOR
JACQUES MULLER

BY Dean, Fairbank & Hirsch
ATTORNEYS

United States Patent Office 3,221,888
Patented Dec. 7, 1965

3,221,888
CLEANING DEVICE FOR FLUID FILTER
Jacques Muller, La Garenne-Colombes, France, assignor to Rellumit Inter, S.a.r.L., La Garenne-Colombes, France, a corporation of France
Filed May 8, 1962, Ser. No. 193,100
Claims priority, application France, May 12, 1961, 861,515
4 Claims. (Cl. 210—333)

This invention relates to fluid filters, and in particular to a device which may be used in conjunction with, or preferably built into, a filter to provide a simple and effective means of cleaning the element or elements, which may be arranged for manual, semi-automatic or fully automatic operation.

It is well known that fluid filters, and in particular liquid filters, must have their elements replaced or cleaned at the end of a certain period of time, dependent upon the amount of foreign matter which is contained in the fluid passing through the filter. The invention is particularly concerned with the edge type filter, of the type for example shown in co-pending application Serial No. 287,346, filed June 12, 1963, usually made of a hard material such as a metal or a rigid synthetic plastic, in which the elements may be cleaned and restored to their original condition, in contrast to the felt or fabric type elements in which the foreign matter becomes embedded in the material of the filter element, so that cleaning and restoration can only be carried out to a very limited extent.

The invention is particularly useful in filters employed in the fuel and lubrication lines of internal combustion engines, such as diesel engines, in which the filters, if heavily clogged, can disturb the satisfactory running of the engine. One advantage of the invention is that the filters may be completely cleaned without being dismantled or, in fact, without even stopping the engine.

The preferred type of filter which is used in conjunction with the cleaning device according to the invention is of the type having superimposed discs formed with micro-grooves on their faces, the grooves being of triangular cross-section, the cross-section at the entry points of the grooves being determined in relation to the particle size of the foreign matter which it is desired to remove, the grooves increasing in cross-section in the direction of flow, so that the particles removed from the fluid are stopped at the entrances to the grooves and are not able to become jammed within the grooves.

One object of the invention is to provide a device for cleaning a filter in which a quantity of filtered fluid is stored in a reservoir cylinder provided for the purpose and is forced through the filter element in a direction opposite to the normal direction of flow in order to sweep away the particles of foreign matter, the supply of unfiltered fluid to the filter being cut off temporarily and the filter casing being connected to a discharge duct or the like in which the foreign matter removed from the filter element may be collected.

A further object is to provide a filter having a reservoir cylinder of filtered fluid containing a piston, in which the pressure of the unfiltered fluid is applied to the piston to clean the element by forcing the filtered fluid through it in a direction opposite to that of normal flow.

Still another object is to provide a filter in which the cleaning of the element is initiated by operating a valve automatically or manually and causing filtered fluid stored in a reservoir cylinder to be forced through the filter element in the direction opposite to the normal direction of flow, in which the valve is automatically restored to the normal position when the filter element has been cleaned.

One embodiment of the invention will now be described by way of example with reference to the accompanying drawings, in which—

Figure 2:
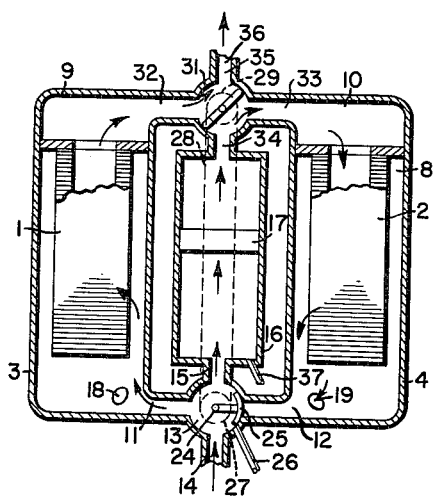
Figure 3:
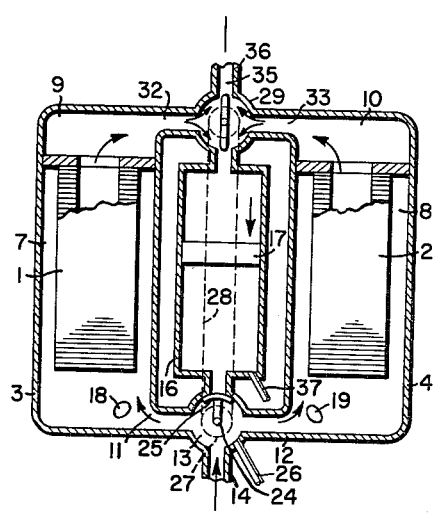
Figure 4:
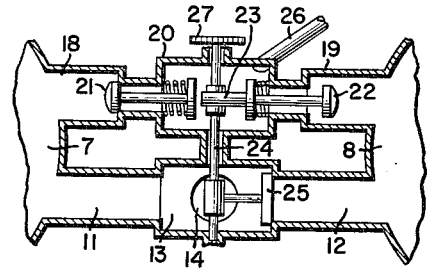

FIGURES 1, 2 and 3 illustrate diagrammatically the arrangement of a filter and cleaning device according to the invention, the different figures showing different stages in the cleaning operation; and FIGURE 4 is a diagram showing the valve mechanism in the lower part of the filter of FIGURES 1 to 3.

Referring first to FIGURES 1, 2 and 3, a diagrammatic vertical section of a filter is shown comprising two filter elements 1 and 2, contained in separate compartments 3 and 4, which together comprise the casing. The filter elements 1 and 2 are made up of a large number of flat rings formed on their faces with triangular microgrooves, the rings being clamped against each other. The elements are fixed at their upper ends respectively to partitions 5 and 6 which separate the filter compartments into lower chambers, respectively 7 and 8, and upper chambers, respectively 9 and 10, the lower chambers 7 and 8 being normally connected to the inlet for unfiltered liquid and being upstream of the filter elements, and the chambers 9 and 10 being normally connected to the outlet and being downstream of the filter elements.

The lower chambers 7 and 8 are provided with opposite ducts 11 and 12 at their lower ends, the ducts communicating with two ports of a four-way valve 13, of which the remaining two ports are connected respectively to a duct 14 leading to the pipe line supplying unfiltered fluid under pressure and to a duct 15 leading to a reservoir cylinder 16 containing a free piston 17.

The lower chambers 7 and 8 are also provided with ducts 18 and 19 which, as particularly shown in FIGURE 4, lead into a valve chamber 20 which is situated behind the valve 13 in FIGURES 1, 2 and 3. The valve chamber 20 contains poppet valves 21 and 22 for closing the respective ducts 18 and 19, the valves being operable separately by a cam 23 mounted on a spindle 24 which also carries the sector 25 of the valve 13, this sector being rotatable to close either the duct 11 or the duct 12 or the duct 15. The valve chamber 20 has a discharge tube 26 connected to it which leads to the tank containing the unfiltered fluid or to a container for receiving foreign matter removed in filtering, neither of which is shown. The spindle 24 projects outside the valve chamber 20 and is fitted with a chain wheel 27 by which it is coupled through an endless chain 28 to another chain wheel 29 fixed to the spindle 30 of a four-way outlet valve 31, of which two opposite ports connect to ducts 32 and 33 communicating respectively with the upper chambers 9 and 10, while the third port 34 communicates with the inner end of the reservoir cylinder 16 and the remaining port 35 communicates with the outlets 36 from the filter.

It will, of course, be understood that while the valves 13 and 31 have been shown as separate valves coupled together by the chain 28 to facilitate the presentation of diagrams and explanation, they could be combined into a single valve structure, together with the valve chamber 20 and its contents.

In operation, the fluid to be filtered arrives under pressure through the duct 14 and, with the valves in the positions shown in FIGURE 1, it passes into the chambers 7 and 8, through the filter elements 1 and 2, into the upper chambers 9 and 10, and thence through the ducts 32 and 33 to the outlet 36.

The device according to the invention enables the elements 1 and 2 to be cleaned individually, so that while one element is being cleaned the other element is in normal operation and the filtering process is not interrupted.

Assuming that element 2 is to be cleaned, the valves 13 and 31 are together rotated in the clockwise direction, the relative sizes of the chain wheels being such that while the spindle of the valve 13 rotates through an angle of 90° to close the duct 12, the spindle 30 of the valve 31 is rotated through an angle of about 45° or 60° to cut off communication between the ducts 32 and 36 on the one hand and 33 and 34 on the other hand. Actuation of the valve 13 places the duct 14 in communication with the duct 15, so that unfiltered fluid under pressure is admitted to the lower end of the reservoir cylinder 16. Operation of the valve 13 also rotates the cam 23 to the position shown in FIGURE 4 to open the valve 22, thus putting the duct 19 into communication with the valve chamber 20 and the inlet duct 14, and also with the impurity discharge tube 26. The pressure of the unfiltered fluid arriving via the duct 15 causes the piston 17 to move upwardly, thus expelling the filtered fluid contained in the inner part of the reservoir cylinder 16, so that this filtered fluid is forced through the filter element 2 in a direction opposite to the normal flow of fluid through the element, the reverse flow causing foreign matter adhering to the outer surface of the element to be detached and to fall towards the bottom of the container, to be carried through the duct 19 into the valve chamber 20 and the discharge tube 26.

When the piston 17 reaches the inner end of its stroke the valves 13 and 31 are returned to their initial position, FIG. 1, so that normal filtering recommences and, due to the pressure of the filtered fluid, the inner part of the reservoir cylinder 16 is automatically refilled with filtered fluid, the unfiltered fluid contained in the outer part of the cylinder 16 being discharged through the tube 37. Once the cylinder 16 is refilled with filtered fluid the element 1 may be cleaned by turning spindles 24 and 30 of the valves 13 and 31 in the anti-clockwise direction.

Where the cleaning device is of the semi-automatic kind, in which the cleaning is initiated manually a visual or acoustic warning means could be added, responsive for example to pressure drop across the element, to indicate when cleaning is required. In the case of the automatic type a counter could be added to record the number of cleaning operations which has taken place.

I claim:

1. Equipment for filtering impurities from fluids comprising a casing having an inlet port for unfiltered fluid and an outlet port for filtered fluid, means dividing said casing into a first and a second section, means mounting at least one filter means in each of said sections and dividing each section into an upstream chamber and a downstream chamber, a cylinder in said casing having a piston movably and sealingly mounted therein, first passage means connecting a first end of said cylinder to the upstream chambers and to said inlet, second passage means connecting the second end of said cylinder to the downstream chambers and to said outlet, first interconnected valve means having a first position controlling said first and second passage means and connecting said inlet port to said upstream chambers and said downstream chambers to said outlet port while cutting off flow to the first end of said cylinder, means to actuate said first valve means to a second position connecting the inlet port with the first end of said cylinder and cutting off flow between said inlet port and the upstream chamber in said first section and between said outlet port and the downstream chamber located in said first section, and further connecting the last mentioned downstream chamber with said second end of said cylinder, a discharge port located in each of the upstream chambers, second valve means normally closing said discharge ports, valve operating means operatively connected to said first valve means and adapted to open the second valve means in the discharge port of the upstream chamber in said first section when said first valve means is in said second position so as to backwash the filter means in said first section, said first valve means being constructed and arranged so as to be movable to a third position wherein the filter means in said second section is backwashed in like manner, and said cylinder having drain means leading therefrom and operative to exhaust fluid from said cylinder when said first valve means is returned to said first position after backwashing.

2. A device as claimed in claim 1 in which said first and second valve means are operated manually to initiate the cleaning operation.

3. A device as claimed in claim 1 in which said filter means comprises a plurality of elements in individual sections of said casing, the first valve means associated with the inlet port being effective to cut off the supply of unfiltered fluid to one section at a time, whereby the element in said one section is cleaned while the other element remains in normal operation.

4. A device as claimed in claim 3 in which said reservoir cylinder communicates with all said sections and serves to clean all said elements.

References Cited by the Examiner

UNITED STATES PATENTS

| | | | |
|---|---|---|---|
| 1,214,152 | 1/1917 | Genter | 210—412 X |
| 2,024,753 | 12/1935 | Zwicky | 210—305 X |
| 2,434,427 | 1/1948 | Muller. | |
| 3,061,102 | 10/1962 | Mayer | 210—412 X |

FOREIGN PATENTS

| | | |
|---|---|---|
| 157,627 | 12/1939 | Austria. |
| 214,774 | 5/1958 | Australia. |
| 598,399 | 5/1960 | Canada. |

REUBEN FRIEDMAN, *Primary Examiner.*

HARRY B. THORNTON, HERBERT L. MARTIN,
*Examiners.*